United States Patent
Twork et al.

(10) Patent No.: US 9,096,184 B2
(45) Date of Patent: Aug. 4, 2015

(54) PLASTIC PANELS FOR MOTOR VEHICLES AND METHODS FOR MAKING THE SAME

(75) Inventors: Michael Twork, White Lake, MI (US); Theodore Konieczny, Warren, MI (US)

(73) Assignee: FAURECIA INTERIOR SYSTEMS, INC., Auburn Hills, MI (US)

(*) Notice: Subject to any disclaimer, the term of this patent is extended or adjusted under 35 U.S.C. 154(b) by 589 days.

(21) Appl. No.: 13/570,650

(22) Filed: Aug. 9, 2012

(65) Prior Publication Data
US 2014/0044926 A1 Feb. 13, 2014

(51) Int. Cl.
B32B 3/00 (2006.01)
B32B 3/12 (2006.01)
B32B 3/26 (2006.01)
B29C 65/06 (2006.01)
(Continued)

(52) U.S. Cl.
CPC . *B60R 13/02* (2013.01); *B32B 3/06* (2013.01); *B32B 27/32* (2013.01); *B60K 37/00* (2013.01); *B29C 65/02* (2013.01); *B29C 65/06* (2013.01); *B29C 65/08* (2013.01); *B29C 66/301* (2013.01); *B29C 66/3022* (2013.01); *B29C 66/30223* (2013.01); *B29C 66/532* (2013.01); *B29C 66/54* (2013.01); *B29C 66/727* (2013.01); *B29K 2105/041* (2013.01); *B29L 2031/3008* (2013.01); *B29L 2031/3038* (2013.01); *B29L 2031/3041* (2013.01); *B60R 21/215* (2013.01); *Y10T 428/2457* (2015.01); *Y10T 428/249976* (2015.04)

(58) Field of Classification Search
CPC ............... Y10T 428/24479; Y10T 428/24496; Y10T 428/24562; Y10T 428/233; B32B 3/00; B32B 3/02; B32B 3/06; B32B 2305/02; B32B 2305/022; B32B 2305/026; B32B 2605/00; B32B 2604/003; B32B 2604/08; B29C 65/06; B29C 66/30223; B60R 13/02; B60R 13/0256; B60R 21/205; B60R 21/215; B60R 21/216; B60R 21/2165; B60K 37/00
USPC ................. 428/31, 71, 156, 158, 166, 304.4, 428/315.5, 315.9, 318.4, 318.8; 156/73.5, 156/77, 78, 79; 280/728.1, 728.2, 728.3
See application file for complete search history.

(56) References Cited

U.S. PATENT DOCUMENTS 3,832,264 A * 8/1974 Barnette .......................... 428/71
8,025,946 B2 9/2011 Fujita et al.
2008/0050576 A1 2/2008 Pierick et al.

FOREIGN PATENT DOCUMENTS

JP 62284729 A 12/1987
JP 7266425 A 10/1995
JP 2003137205 A 5/2003

*Primary Examiner* — Catherine A Simone
(74) *Attorney, Agent, or Firm* — Ingrassia Fisher & Lorenz PC

(57) ABSTRACT

Plastic panels for motor vehicles and methods for making plastic panels are provided herein. In one example, a plastic panel for a motor vehicle comprises a first molded microcellular polymeric substrate and a second polymeric substrate. The first molded microcellular polymeric substrate has a first outer skin, a second outer skin, a microcellular structured core that is disposed between the first and second outer skins, and a wall that extends between the first and second outer skins to define a support structure in the microcellular structured core. The second polymeric substrate comprises a weld feature that is aligned with the support structure and that is coupled to the second outer skin of the first molded microcellular polymeric substrate.

15 Claims, 6 Drawing Sheets

(51) Int. Cl.
*B60R 13/02* (2006.01)
*B32B 27/32* (2006.01)
*B32B 3/06* (2006.01)
*B60K 37/00* (2006.01)
*B29C 65/02* (2006.01)
*B60R 21/215* (2011.01)
*B29L 31/30* (2006.01)
*B29C 65/08* (2006.01)
*B29C 65/00* (2006.01)
*B29K 105/04* (2006.01)

PLASTIC PANELS FOR MOTOR VEHICLES AND METHODS FOR MAKING THE SAME

TECHNICAL FIELD

The technical field relates generally to plastic panels for motor vehicles, and more particularly relates to plastic panels including welded polymeric substrates for motor vehicles and methods for making such plastic panels.

BACKGROUND

In the transportation industry, there is considerable impetus for the reduction of weight of vehicle components. In many cases, for example, the reductions in weight are necessary to achieve designated fuel economy standards that are becoming even more stringent. Alternative designs and/or constructions of many vehicle components are often considered particularly in the automotive sector as well as in other transportation industries if the resulting parts can achieve significant weight savings.

Recently, some automakers have been exploring the use of microcellular foaming technologies for molding lighter weight plastic substrates for overall vehicle weight reduction and improved fuel economy. Plastic substrates that are formed using microcellular foaming technologies (e.g., microcellular polymeric substrates) typically include a microcellular structured core that is sandwiched between two outer skins all of which are formed during a molding process. In one example, during an early stage of the molding process, carbon dioxide, nitrogen and/or the like is introduced or released into a polymer melt to produce a low viscosity multi-component polymer melt that is injected into a molding tool. When the low viscosity multi-component polymer melt contacts the cooler metal surfaces of the molding tool that define a molding cavity, a boundary layer(s) of solid polymeric material is rapidly formed, e.g., rapidly freezes or solidifies, along the cooler metal surfaces to form the outer skins. The remaining space in the molding cavity between the outer skins is progressively packed with the low viscosity multi-component polymer melt, which develops microscopic-sized bubbles or voids (e.g., of carbon dioxide and/or nitrogen) in the polymeric material while cooling and more gradually solidifying to form the microcellular structured core. The microscopic-sized bubbles or voids help reduce the total density of the microcellular polymeric substrate for overall weight reduction.

Some vehicle parts are formed by welding (e.g., vibration welding, ultrasonic welding, friction welding, or the like) two or more plastic substrates together to form a welded plastic panel. Examples of such vehicle parts include interior or exterior trim components and/or structural components, such as instrument panels with integrated airbag systems, door trim panels and modules, consoles, defroster ducts, and knee bolster and/or glove box door assemblies. Unfortunately, welding two or more plastic substrates together when one or more of the plastic substrates is a microcellular polymeric substrate can produce a plastic panel that has less robust and/or lower weld strength weld joints than traditional plastic panels that are formed from welding two or more solid plastic substrates together. In particular, it is believed that the microcellular structured core of the microcellular polymeric substrate is relatively compliant and compresses during the welding process in response to welding pressure that is applied to join the two plastic substrates together. This effectively decreases the resulting welding pressure that otherwise should be relatively high to form robust and/or high weld strength weld joints. This can be problematic particularly in relatively high energy, high stress, and/or high impact plastic panel applications, e.g., instrument panels with integrated airbag systems, knee bolsters, and the like, where robust and/or higher weld strength weld joints may be needed to avoid partial or full delamination of the plastic substrates.

One conventional approach to improving the weld strength of weld joints of plastic panels is disclosed in U.S. Pat. No. 8,025,946, issued to Fujita et al. In Fujita, a vibration-welded structure including two plastic parts that are joined together by vibration welding is provided. Each of the two plastic parts has a welding rib with a corresponding welding surface. The welding ribs are each provided with a guide portion capable of guiding the movement of the other welding rib in a vibration direction. This arrangement helps improve the welding strength of welding joints formed between the two parts in cases where the angle between the welded surfaces and the vibration direction becomes relatively large by focusing the welding pressure on the welding surfaces. Unfortunately, the guide portions do not effectively increase the welding pressure along the welding surfaces in cases where one or both of the plastic parts have a relatively compliant core that compresses in response to the applied welding pressure, e.g., microcellular polymeric substrate.

Another conventional approach to improving the weld strength of welding joints of plastic panels is to increase the welding surface area for forming the welding joints. Unfortunately, this is not always practical because package space is often limited in many applications and increasing the welding surface area may not be a viable option.

Accordingly, it is desirable to provide plastic panels for motor vehicles that include a microcellular polymeric substrate welded to a polymeric substrate for overall weight reduction and that have robust and/or relatively high weld strength weld joints, and methods for making such plastic panels. Moreover, it is desirable to provide plastic panels for motor vehicles that include a microcellular polymeric substrate welded to a polymeric substrate that can be accommodated in relatively limited package space, and methods for making such plastic panels. Furthermore, other desirable features and characteristics of the present invention will become apparent from the subsequent detailed description and the appended claims, taken in conjunction with the accompanying drawings and this background.

BRIEF SUMMARY

Plastic panels for motor vehicles and methods for making plastic panels are provided herein. In accordance with an exemplary embodiment, a plastic panel for a motor vehicle comprises a first molded microcellular polymeric substrate and a second polymeric substrate. The first molded microcellular polymeric substrate has a first outer skin, a second outer skin, a microcellular structured core that is disposed between the first and second outer skins, and a wall that extends substantially between the first and second outer skins to define a support structure in the microcellular structured core. The second polymeric substrate comprises a weld feature that is aligned with the support structure and that is coupled to the second outer skin of the first molded microcellular polymeric substrate.

In accordance with another exemplary embodiment, a method for making a plastic panel for a motor vehicle is provided. The method comprises the steps of forming a first molded microcellular polymeric substrate. The first molded microcellular polymeric substrate has a first outer skin, a second outer skin, a microcellular structured core that is disposed between the first and second outer skins, and a wall that extends substantially between the first and second outer skins to define a support structure in the microcellular structured core. A weld feature of a second polymeric substrate is positioned along the second outer skin and is aligned with the support structure of the first molded microcellular polymeric substrate. The weld feature is welded to the second outer skin to attach the second polymeric substrate to the first molded microcellular polymeric substrate.

BRIEF DESCRIPTION OF THE DRAWINGS

The various embodiments will hereinafter be described in conjunction with the following drawing figures, wherein like numerals denote like elements, and wherein:

FIGS. 1-8C illustrate methods for fabricating plastic panels for motor vehicles in accordance with various embodiments. FIGS. 1, 3A-3B, 4, 7, and 8A-8C illustrate the plastic panel in cross sectional views during various stages of its fabrication. FIGS. 2A-2B and 5-6 illustrate the plastic panel in plan views during various stages of its fabrication.

DETAILED DESCRIPTION

Figure 1:
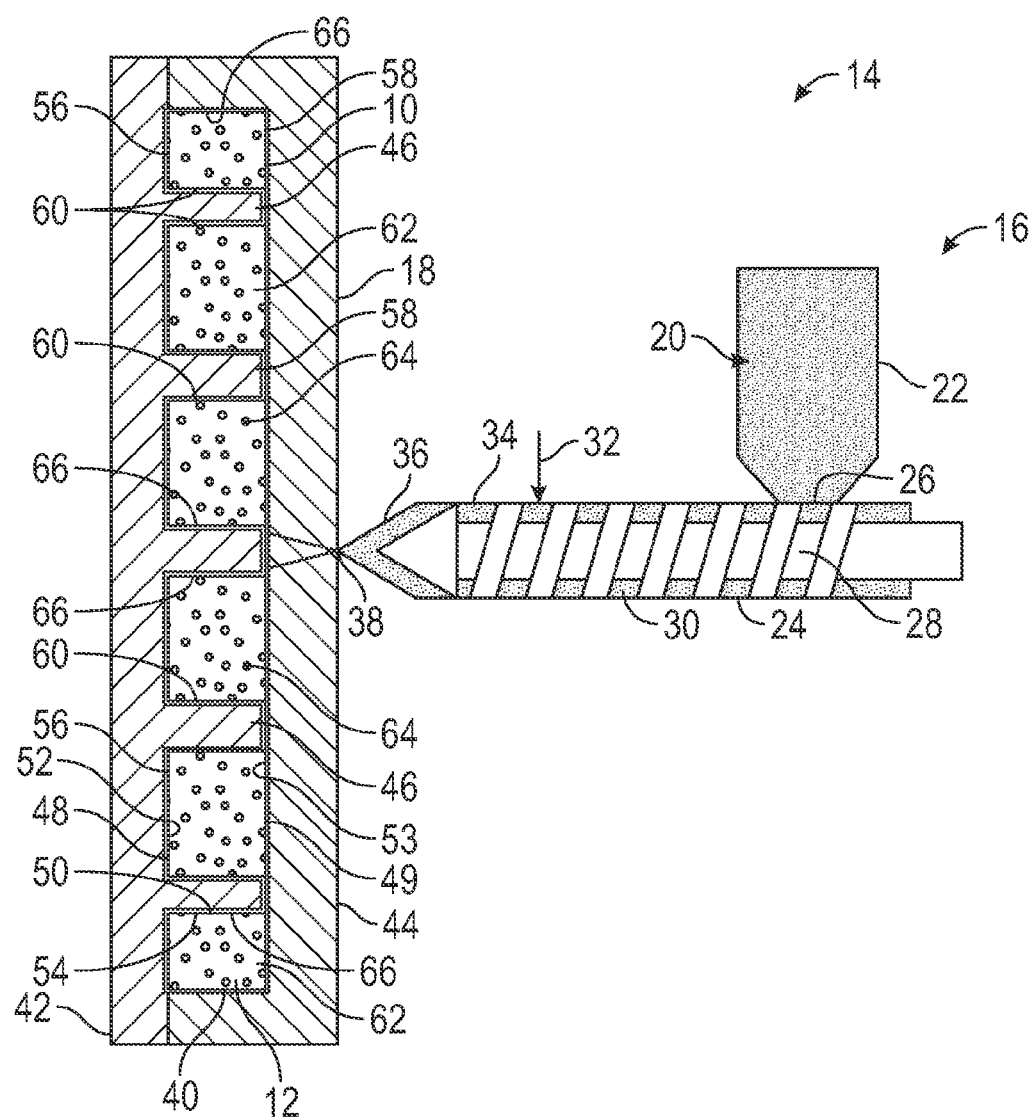

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to plastic panels including welded polymeric substrates for motor vehicles, and methods for making such plastic panels. The exemplary embodiments taught herein provide a plastic panel for a motor vehicle comprising a first molded microcellular polymeric substrate and a second polymeric substrate. The first molded microcellular polymeric substrate is formed, for example, via injection molding or the like and has a first outer skin, a second outer skin, and a microcellular structured core that is disposed between the first and second outer skins. A wall extends substantially between the first and second outer skins and through the microcellular structured core. In particular and as will be described in further detail below, the microcellular structured core is formed of a polymeric material having microscopic-sized bubbles or voids and is relatively lightweight and compliant. The first and second outer skins and the wall are also formed of the polymeric material but the polymeric material is solid (e.g., substantially more dense than the microcellular structured core) and substantially free of microscopic-sized bubbles or voids. Therefore, the first and second outer skins and the wall are less compliant or substantially stiffer than the microcellular structured core. As such, the wall effectively defines a support structure in the more compliant microcellular structured core to help support the first and second outer skins to locally resist compression under an applied load.

In an exemplary embodiment, the second polymeric substrate is formed via injection molding or the like and has at least one weld feature. In one example, the weld feature is configured as a positive feature, such as a rib or boss, for focusing weld energy during a welding process. The second polymeric substrate is positioned such that the weld feature is disposed along the second outer skin of the molded microcellular polymeric substrate and is aligned with the support structure defined by the wall. The weld feature is welded to the second outer skin to attach the second polymeric substrate to the first molded microcellular polymeric substrate. During welding, welding pressure is applied to the first and second polymeric substrates and the support structure helps locally resist compression of the microcellular structured core so that the second outer skin is adequately supported to form a robust and/or a relatively high weld strength weld joint between the first and second polymeric substrates. Moreover, the plastic panel includes the first microcellular polymeric substrate welded to the second polymeric substrate for overall weight reduction. Additionally, the robust and/or relatively high weld strength weld joint results at least in part from support from the support structure, which is efficiently packaged within the microcellular structured core without requiring any additional external package space.

FIGS. 1-8C illustrate methods for fabricating a plastic panel 10 for a motor vehicle in accordance with various embodiments. The described process steps, procedures, and materials are to be considered only as exemplary embodiments designed to illustrate to one of ordinary skill in the art methods for practicing the invention; the invention is not limited to these exemplary embodiments. Various steps in the manufacture of plastic panels are well known and so, in the interest of brevity, many conventional steps will only be mentioned briefly herein or will be omitted entirely without providing the well-known process details.

FIG. 1 illustrates, in cross sectional view, a portion of the plastic panel 10 including a molded microcellular polymeric substrate 12 at an early fabrication stage in accordance with an exemplary embodiment. As illustrated, the molded microcellular polymeric substrate 12 is formed using a molding arrangement 14. The molding arrangement 14 includes an injection molding machine 16 and a molding tool 18. The injection molding machine 16 is configured for molding the molded microcellular polymeric substrate 12 using a microcellular foaming process.

The injection molding machine 16 is fed polymeric material 20 via a hopper 22. In an exemplary embodiment, the polymeric material 20 comprises polypropylene (PP), thermoplastic olefin (TPO), polycarbonate (PC), ABS, styrene maleic anhydride (SMA), polyamide (PA), polyurethane (PU or TPU), polyester (PE), or combinations thereof. In one embodiment, the polymeric material 20 is a PP/TPO material, which is particularly well-suited for many vehicle interior plastic panel applications. As used herein, the term "PP/TPO material" refers to a material that contains polypropylene (PP) and/or thermoplastic olefin (TPO). Additionally, the polymeric material 20 may be unfilled, filled, or compounded to provide desired properties for a particular application. Other polymeric materials for molding polymeric substrates known to those skilled in the art may also be used.

The polymeric material 20 is received into a barrel 24 via an inlet 26 located at one end of the barrel 24. Within the barrel 24, the polymeric material 20 is moved forward by the rotating motion of the reciprocating screw 28 while being stirred, sheared, and heated by the action of the reciprocating screw 28. The shearing and heating is done to bring the polymeric material 20 into a melted state to form a polymer melt 30.

In one embodiment, a fluid 32 (e.g., gas or super critical fluid) is injected into the polymer melt 30 to form a low viscosity multi-component polymer melt 34. The fluid 32 can be carbon dioxide, nitrogen, and/or the like and acts as a blowing agent for the microcellular forming process. An example of one such microcellular foaming process is the MuCell® Process, which is commercially available and may be licensed from Trexel Inc., located in Wilmington Mass. Alternatively, a chemical blowing agent(s) may be combined with the polymeric material 20 in the hopper 22 so that a gas, gases, and/or a super critical fluid(s) is released into the polymer melt 30 during shearing and heating in the barrel 24 to form the low viscosity multi-component polymer melt 34.

The low viscosity multi-component polymer melt 34 passes into an accumulation zone 36, located within the barrel 24 beyond the forward end of the reciprocating screw 28. Upon an accumulation of a desired amount of the low viscosity multi-component polymer melt 34 in the accumulation zone 36, the injection portion of the cycle is initiated by advancing the reciprocating screw 28 with a hydraulic or other actuator. Advancement of the reciprocating screw 28 causes the low viscosity multi-component polymer melt 34 in the accumulation zone 36 to be ejected through a nozzle 38 into the molding tool 18 to fill a molding cavity 40 that is defined by matched mold portions 42 and 44.

The matched mold portions 42 and 44 may be made from metal, such as tool steel (e.g., P20 tool steel or the like) or any other material known to those skilled of art for making tools for molding polymeric materials. As illustrated, the molding tool 18 includes a plurality of positive features 46 extending from the matched mold portion 42 into the molding cavity 40 towards the matched mold portion 44. In an exemplary embodiment, the positive features 46 are configured as cylindrical-type structures or bosses. Alternatively, the positive features 46 may be configured as ribs. Other positive feature-type shapes may be used to form the positive features 46. As shown, the positive features 46 may be integrally formed with the matched mold portion 42, or alternatively, may be part of a separate slide or lifter arrangement that may be actuated to move relative to the matched mold portion 42.

In an exemplary embodiment, the matched mold portions 42 and 44 and the positive features 46 are at a significantly lower temperature(s) than the low viscosity multi-component polymer melt 34. As such, when the low viscosity multi-component polymer melt 34 contacts the surfaces 48, 49, and 50 of the corresponding matched mold portions 42 and 44 and the positive features 46, boundary layers 52, 53, and 54 of the polymeric material 20 rapidly cool and solidify along the surfaces 48, 49, and 50. The boundary layers 52 and 53 define outer skins 56 and 58, respectively, and the boundary layers 54 define walls 60. In an exemplary embodiment, the outer skins 56 and 58 have a thickness of from about 0.1 to about 0.75 mm, and the walls 60 have a thickness of from about 2.0 to about 4.0 mm.

The remaining space in the molding cavity 40 between the outer skins 56 and 58 and the walls 60 are progressively filled and packed out with the low viscosity multi-component polymer melt 34, which more gradually cools and solidifies to form a microcellular structured core 62. In particular, while the low viscosity multicomponent polymer melt 34 cools more gradually in the remaining spaces of the molding cavity 40 before solidifying, gas from the blowing agent (e.g., fluid 32 or a chemical blowing agent as discussed above) is able to coalesce to form microscopic-sized bubbles or voids 64 in the polymeric material 20. In an exemplary embodiment, the microscopic-sized bubbles or voids 64 have an average cell size of about 100µ or less, such as about 50µ or less, for example from about 5 to about 50µ.

The outer skins 56 and 58 and the walls 60, which cool more rapidly and substantially prevent gas from the blowing agent from coalescing, are relatively solid and substantially free of microscopic-sized bubbles or voids compared to the microcellular structured core 62. Thus, the outer skins 56 and 58 and the walls 60 are more dense and stiffer than the microcellular structured core 62. As such, the walls 60 effectively define support structures 66 in the microcellular structured core 62 to help support the outer skins 56 and 58 to locally resist compression under an applied load.

Figure 2A:
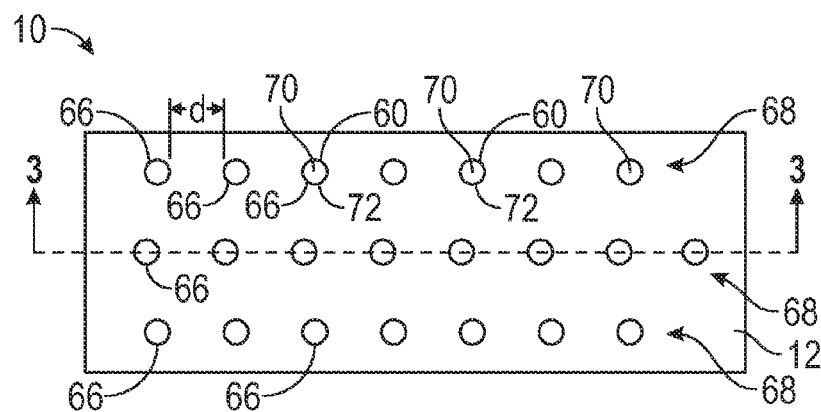

FIGS. 2A-3B illustrate the molded microcellular polymeric substrate 12 at a further advanced fabrication stage in accordance with various embodiments. As illustrated, the molded microcellular polymeric substrate 12 is removed from the molding tool 18 (see FIG. 1). FIG. 2A shows, in accordance with an exemplary embodiment, the support structures 66 arranged in the molded microcellular polymeric substrate 12 in a plurality of juxtaposed rows 68. In one embodiment, the adjacent support structures 66 in a corresponding row 68 are spaced apart a distance (indicated by arrows "d") of from about 3 to about 25 mm. As will be discussed in further detail below, arranging the support structures 66 in the juxtaposed rows 68 with the adjacent support structures 66 in a corresponding row 68 spaced apart at the distance "d" advantageously positions the support structures 66 to provide firm, local support to the outer skins 56 and 58 for welding to help provide robust and/or higher weld strength weld joints.

Figure 3A:
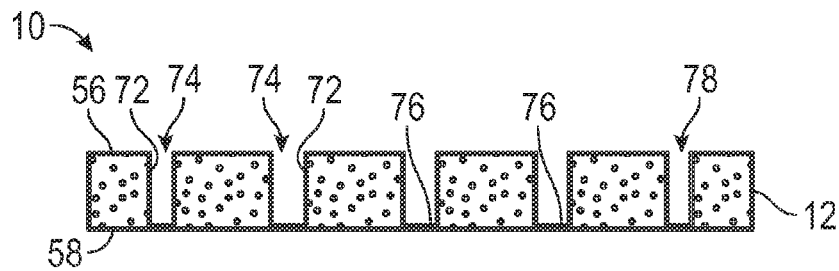
Figure 3B:
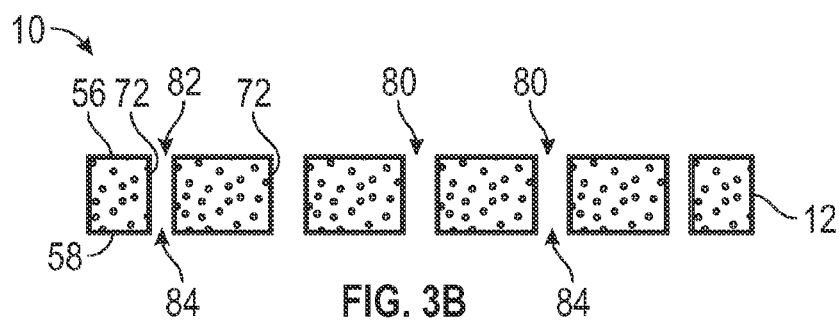

In accordance with an exemplary embodiment and as illustrated, the walls 60 each surround a space 70 such that the support structures 66 are configured as hollow support structures 72. By configuring the support structures 66 as hollow support structures 72, the support structures 66 are advantageously more robust and stable in response to lateral stresses that may occur during welding. As illustrated in FIG. 3A, in an exemplary embodiment, the hollow support structures 72 define a plurality of blind holes 74 each having a closed end 76 that is disposed adjacent to the outer skin 58 and an opened end 78 that defines an opening in the outer skin 56. In accordance with another exemplary embodiment and as illustrated in FIG. 3B, the hollow support structures 72 define a plurality of through holes 80 each having corresponding opened ends 82 and 84 that define openings in the outer skins 56 and 58, respectively. In an exemplary embodiment, the blind holes 74 and/or the through holes 80 have corresponding diameters of from about 0.5 to about 5 mm.

Figure 2B:
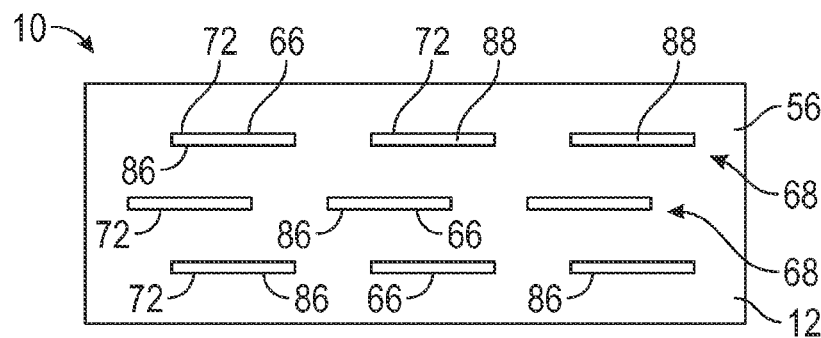

Referring to FIG. 2B, in another exemplary embodiment, the hollow support structures 72 define a plurality of trenches 86 each having an opened end 88 that defines an opening in the outer skin 56 and a closed end at the bottom of the corresponding trench 86 adjacent to the outer skin 58. As illustrated, the trenches 86 may be arranged in the molded microcellular polymeric substrate 12 in the juxtaposed rows 68 as discussed above.

Figure 4:
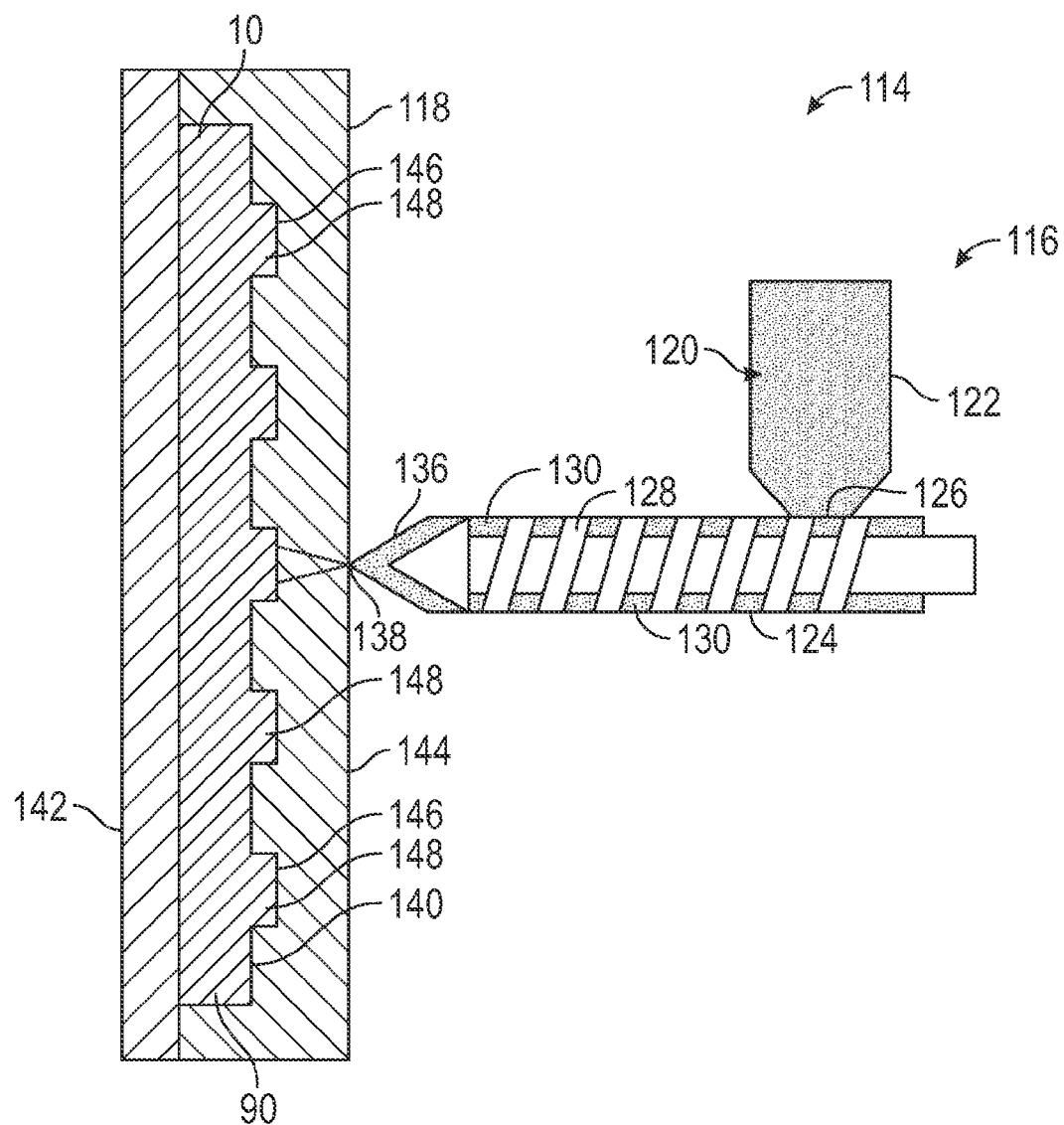

The process continues as illustrated in FIG. 4 by forming a polymeric substrate 90 as another part of the plastic panel 10. In an exemplary embodiment, the polymeric substrate 90 is formed in a molding arrangement 114 that is configured similarly to the molding arrangement 14 as discussed above but that is not necessarily configured to use a microcellular forming process. In particular, the molding arrangement 114 includes an injection molding machine 116 and a molding tool 118.

The injection molding machine 116 is fed polymeric material 120 via a hopper 122. In an exemplary embodiment, the polymeric material 120 comprises a thermoplastic elastomeric/elastomer (TPE) material, PP, TPO, PC, ABS, SMA, PA, PU or TPU, PE, or combinations thereof. In one embodiment, the polymeric material 120 is a PP/TPO material, which as discussed above is particularly well-suited for many vehicle interior plastic panel applications. In an alternative embodiment, the polymeric material 120 is a TPE material which is particularly well-suited for many high energy, high stress, or high impact applications. Additionally, the polymeric material 120 may be unfilled, filled, or compounded to provide desired properties for a particular application. Other polymeric materials for molding polymeric substrates known to those skilled in the art may also be used.

The polymeric material 120 is received into a barrel 124 via an inlet 126 located at one end of the barrel 124. Within the barrel 124, the polymeric material 120 is moved forward by the rotating motion of the reciprocating screw 128 while being stirred, sheared, and heated by the action of the reciprocating screw 128. The shearing and heating is done to bring the polymeric material 120 into a melted state to form a polymer melt 130.

The polymer melt 130 passes into an accumulation zone 136, located within the barrel 124 beyond the forward end of the reciprocating screw 128. Upon an accumulation of a desired amount of the polymer melt 130 in the accumulation zone 136, the injection portion of the cycle is initiated by advancing the reciprocating screw 128 with a hydraulic or other actuator. Advancement of the reciprocating screw 128 causes the polymer melt 130 in the accumulation zone 136 to be ejected through a nozzle 138 into the molding tool 118 to fill a molding cavity 140 that is defined by matched mold portions 142 and 144.

As illustrated, the molding tool 118 includes a plurality of negative features 146 defined in the match mold portion 144. In an exemplary embodiment, the negative features 146 are configured as trenches. Alternatively, the negative features 146 may be configured as holes. Other negative feature-type shapes may be used to form the negative features 146.

The polymer melt 130 flows into the molding cavity 140 and contacts the surfaces of the matched mold portions 142 and 144, which cools and solidifies the polymer melt 130 to form the polymeric substrate 90. In particular, the polymer melt 130 that fills the negative features 146 form weld features 148 in the polymeric substrate 90.

Figure 5:
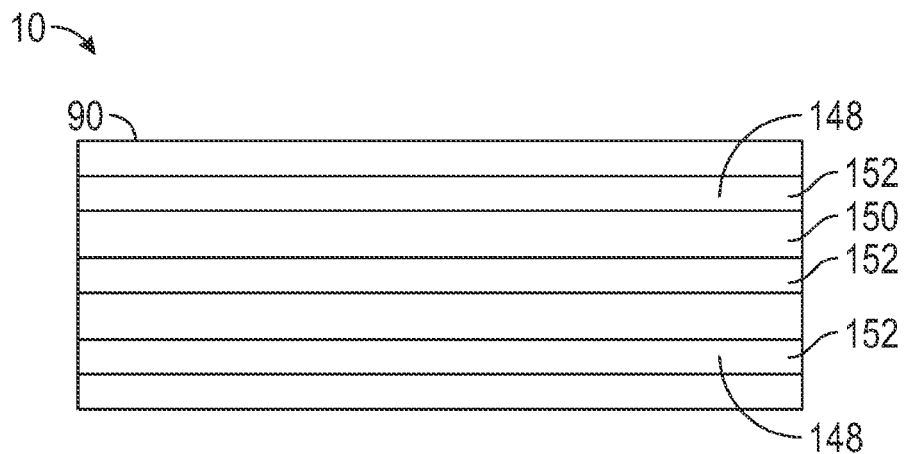

As illustrated in FIG. 5, the process continues by removing the polymeric substrate 90 from the molding tool 118 (see FIG. 4). In an exemplary embodiment, the weld features 148 of the polymeric substrate 90 are configured as ribs 152 that are juxtaposed along a panel section portion 150 of the polymeric substrate 90 to correspondingly match the juxtaposed rows 68 of the support structures 66 of the molded microcellular polymeric substrate 12 (see FIG. 2A).

Figure 6:
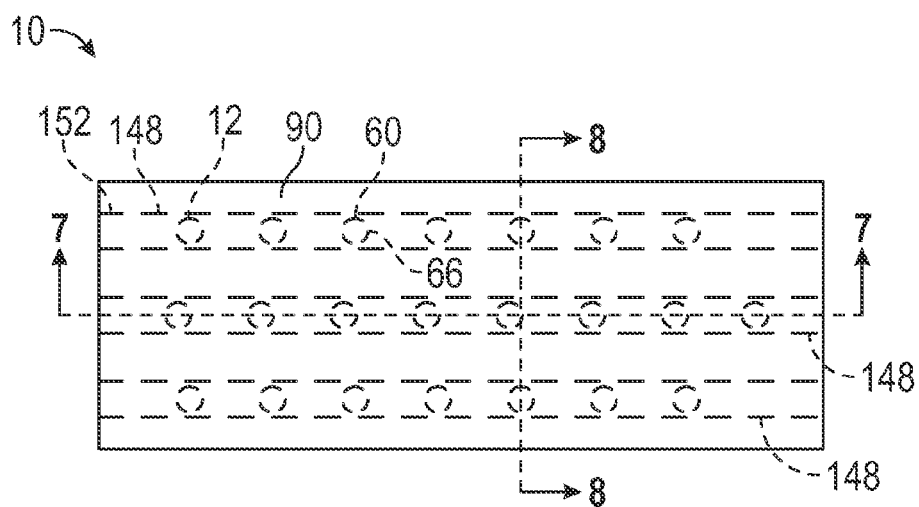
Figure 7:
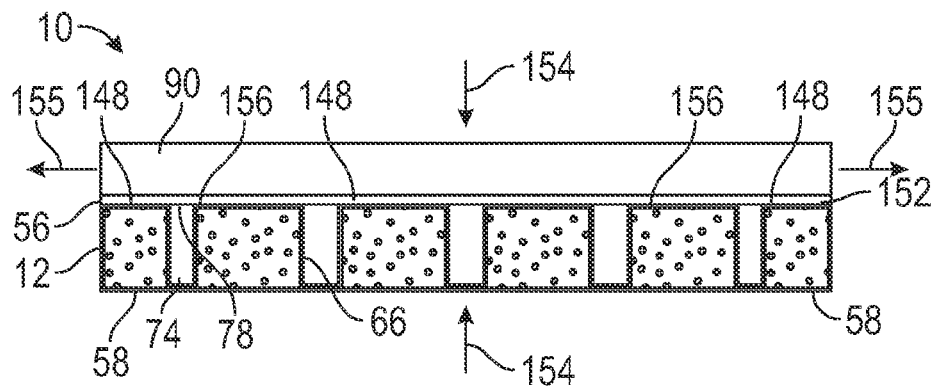
Figure 8A:
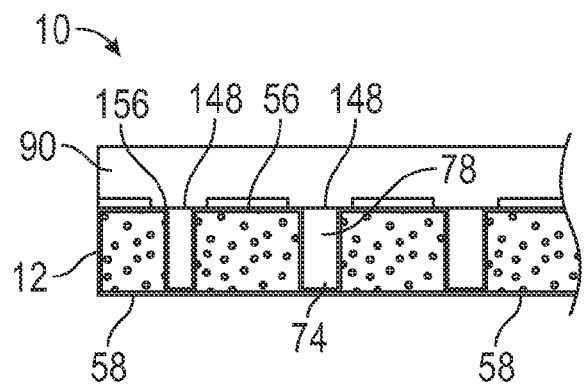
Figure 8B:
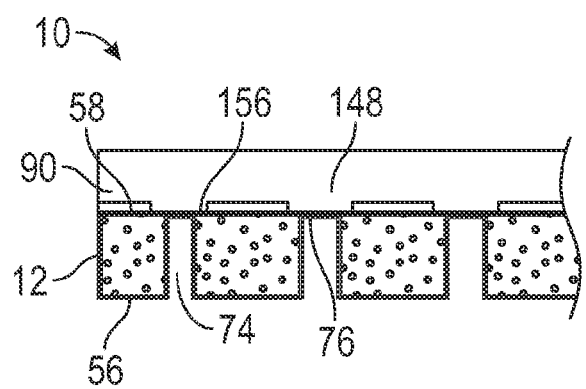
Figure 8C:
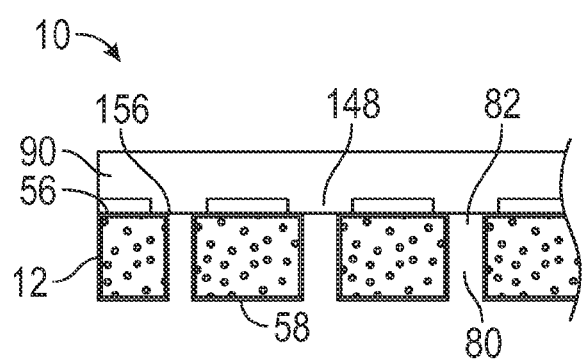

FIGS. 6-7 illustrate, in accordance with an exemplary embodiment, the plastic panel 10 at a further advanced fabrication stage. In an exemplary embodiment, the polymeric substrate 90 and the molded microcellular polymeric substrate 12 are stacked and positioned such that the weld features 148 are aligned with the structural supports 66. In particular and as illustrated, the weld features 148 (e.g., ribs 152) of the polymeric substrate 90 are disposed adjacent to the outer skin 58 and overlie the juxtaposed rows 68 of the support structures 66. The molded microcellular polymeric substrate 12 and the polymeric substrate 90 are welded together using a welding process that applies welding pressure (indicated by arrows 154) and moves the polymeric substrates 12 and 90 relative to each other in side-to-side directions (indicated by arrows 155). The welding process may be a vibration welding process, an ultrasonic welding process, a friction welding process, or any other plastic welding process known to those skilled in the art. The support structures 66 locally reinforce the molded microcellular polymeric substrate 12 adjacent to the weld features 148 so that molded microcellular polymeric substrate 12 resists compression from the welding pressure 154. In an exemplary embodiment, the welding process forms robust and/or relatively high weld strength welding joints 156 that couple the weld features 148 (e.g., ribs 152) with the outer skin 58. In one embodiment and as illustrated in FIGS. 7 and 8A, the weld features 148 are disposed along the opened ends 78 of the blind holes 74. This advantageously allows the outer skin 58 to be used as an appearance surface without exposing the underlying welded structure. In an alternative embodiment and as illustrated in FIG. 8B, the weld features 148 of the polymeric substrate 90 are disposed adjacent to the outer skin 56 proximate the closed ends 76 of the blind holes 74. This advantageously provides greater surface area between the weld features 148 and the outer skin 58 for forming welding joints 156. In yet another embodiment and as illustrated in FIG. 8C, the weld features 148 of the polymeric substrate 90 are disposed adjacent to the outer skin 56 along the opened ends 82 of the through holes 80. The use of through holes 80 advantageously allows the positive features 46 in the molding tool 18 to shut off against the matched mold portion 44 for a more robust molding process (see FIG. 1).

Figure 9:
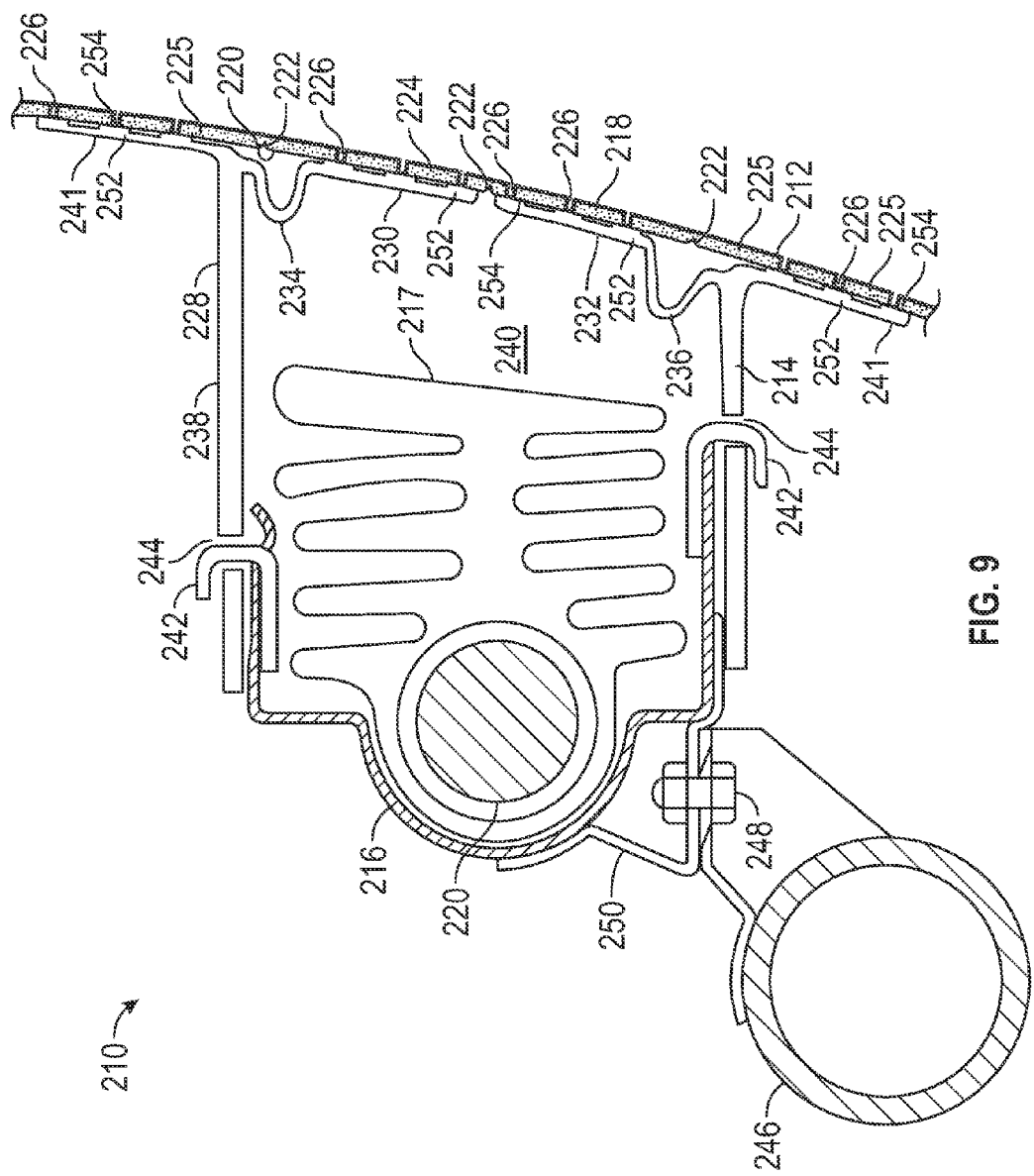
FIG. 9 is a vertical cross sectional view of a plastic panel for a motor vehicle including an instrument panel substrate and an airbag chute-door assembly in accordance with an exemplary embodiment.

FIG. 9 is a vertical sectional view of the interior panel 210 in accordance with an exemplary embodiment. As illustrated, the interior panel 210 is an instrument panel that can be positioned forward of a driver seat and a front passenger seat of a motor vehicle. As such, FIG. 9 depicts a view of the interior panel 210 forward of the front passenger seat. Alternatively, the interior panel 210 can be a door panel or other interior vehicle trim panel. As illustrated, the interior panel 210 comprises a molded microcellular polymeric substrate 212 formed in a manner as discussed above, an airbag chute-door assembly 214, and an airbag module 216 that contains a deployable airbag 217 and an inflator 220.

In an exemplary embodiment, the molded microcellular polymeric substrate 212 is formed of a PP/TPO material. An outer skin 218 of the molded microcellular polymeric substrate 212 can be a hard decorative surface, such as a mold-in-color surface, a painted surface, or the like. Alternatively, the outer skin 218 can be covered by foam and skin, such as in well-known foam-in-place or tri-laminate constructions, to provide a "soft instrument panel."

An outer skin 220 of the molded microcellular polymeric substrate 212 may be scored or pre-weakened to define a seam 222 that defines an integrated airbag deployment door 224. The integrated airbag deployment door 224 separates from the molded microcellular polymeric substrate 212 along the seam 222 and opens in a bi-parting manner to permit the airbag 217 to unfold and inflate outside of the interior panel 210 to facilitate an airbag deployment. As illustrated, the molded microcellular polymeric substrate 212 has a microcellular structured core 225 disposed between the outer skins 218 and 220 and a plurality of support structures 226 formed therein as discussed above.

Attached to the outer skin 220 is the airbag chute-door assembly 214. In an exemplary embodiment, the airbag chute-door assembly 214 is formed of a TPE material. The airbag chute-door assembly 214 comprises a chute portion 228, door flap portions 230 and 232, and hinges 234 and 236 that pivotally connect the door flap portions 230 and 232, respectively, to the chute portion 228. The chute portion 228 has a chute wall 238 that at least partially surrounds an interior space 240. The interior space 240 is sized to permit passage of the airbag 217 towards the door flap portions 230 and 232 and the integrated airbag deployment door 224 during airbag deployment. The chute portion 228 also includes a perimeter flange 241 that extends from an end portion of the chute wall 238 away from the interior space 240. Attached to the chute wall 238 is the airbag module 216 that accommodates the airbag 217 in a folded state. As shown, the airbag module 216 has a plurality of hooks 242 that project outwardly through chute wall openings 244 to engage the chute wall 238. The airbag module 216 is attached to a cross member 246 by a bolt and nut 248 via a supporting member 250.

In an exemplary embodiment, the door flap portions 230 and 232 and the perimeter flange 241 have a plurality of weld features 252 that are aligned with the support structures 226 and that are coupled via weld joints 254 to the outer skin 220. As discussed above, by aligning the weld features 252 with the support structures 226 during a welding process, the weld joints 254 will be robust and/or will have relatively high weld strength because the support structures 226 will help resist compression of the microcellular structured core 225 when welding pressure is applied. Having robust and/or relatively high weld strength weld joints 254 is particularly advantageous for high energy and/or high stress applications like airbag deployments to help prevent partial or full delamination of the molded microcellular polymeric substrate 212 from the airbag chute-door assembly 214. Moreover, the molded microcellular polymeric substrate 212 is relatively lightweight for overall weight reduction. Additionally, the robust and/or relatively high weld strength weld joints 254 result at least in part from support during welding from the support structures 226, which are efficiently packaged within the microcellular structured core 225 without requiring any additional external package space.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A plastic panel for a motor vehicle, the plastic panel comprising:
    a first molded microcellular polymeric substrate having a first outer skin, a second outer skin, a microcellular structured core disposed between the first and second outer skins, and a wall extending substantially between the first and second outer skins defining a support structure in the microcellular structured core; and
    a second polymeric substrate comprising a weld feature that is aligned with the support structure and that is coupled to the second outer skin of the first molded microcellular polymeric substrate.

2. The plastic panel of claim 1, wherein the wall at least partially surrounds a space such that the support structure is configured as a hollow support structure.

3. The plastic panel of claim 2, wherein the hollow support structure defines a blind hole having a closed end disposed adjacent to one of the first and second outer skins and an opened end disposed adjacent to the other of the first and second outer skins.

4. The plastic panel of claim 3, wherein the blind hole has a diameter of from about 0.5 to about 5 mm.

5. The plastic panel of claim 2, wherein the hollow support structure defines a trench having a closed end disposed adjacent to one of the first and second outer skins and an opened end disposed adjacent to the other of the first and second outer skins.

6. The plastic panel of claim 2, wherein the hollow support structure has a closed end disposed adjacent to the second outer skin and an opened end disposed adjacent to the first outer skin defining an opening and the first outer skin.

7. The plastic panel of claim 2, wherein the hollow support structure has a closed end disposed adjacent to the first outer skin and an opened end disposed adjacent to the second outer skin defining an opening in the second outer skin, and wherein the weld feature is disposed along the opening.

8. The plastic panel of claim 2, wherein the hollow support structure defines a through hole having a first opened end defining a first opening in the first outer skin and a second opened end defining a second opening in the second outer skin.

9. The plastic panel of claim 1, wherein the first molded microcellular polymeric substrate and the second polymeric substrate comprise a first PP/TPO material and a second PP/TPO material, respectively.

10. The plastic panel of claim 1, wherein the first molded microcellular polymeric substrate and the second polymeric substrate comprise a PP/TPO material and a TPE material, respectively.

11. The plastic panel of claim 1, wherein the first molded microcellular polymeric substrate has a plurality of walls defining a plurality of support structures that are arranged in a plurality of juxtaposed rows, and wherein the second polymeric substrate comprises a plurality of weld features that are correspondingly aligned with the juxtaposed rows and that are coupled to the second outer skin of the first molded microcellular polymeric substrate.

12. The plastic panel of claim 11, wherein adjacent support structures in a corresponding row of the juxtaposed rows are spaced apart a distance of from about 3 to about 25 mm.

13. The plastic panel of claim 1, wherein the plastic panel is a vehicle interior panel of the motor vehicle.

14. The plastic panel of claim 13, wherein the vehicle interior panel is an instrument panel, the first molded microcellular polymeric substrate is an instrument panel substrate, and the second polymeric substrate is an airbag chute-door assembly, and wherein the airbag chute-door assembly comprises:
    a chute portion having a chute wall that at least partially surrounds an interior space sized to permit passage of an airbag during deployment;
    a door flap portion disposed adjacent to the interior space and comprising the weld feature; and
    a hinge pivotally connecting the door flap portion to the chute portion.

15. A method of making a plastic panel for a motor vehicle, the method comprising the steps of:
    forming a first molded microcellular polymeric substrate having a first outer skin, a second outer skin, a microcellular structured core disposed between the first and second outer skins, and a wall extending substantially between the first and second outer skins defining a support structure in the microcellular structured core;
    positioning a weld feature of a second polymeric substrate along the second outer skin and aligned with the support structure of the first molded microcellular polymeric substrate; and
    welding the weld feature to the second outer skin to attach the second polymeric substrate to the first molded microcellular polymeric substrate.

* * * * *